United States Patent

McKewen

[15] 3,665,676
[45] May 30, 1972

[54] METHOD OF AND APPARATUS FOR CHEMICALLY CONDITIONING A PARTICLE-LADEN GAS STREAM

[72] Inventor: John L. McKewen, Cockeysville, Md.
[73] Assignee: Koppers Company, Inc.
[22] Filed: Nov. 12, 1970
[21] Appl. No.: 88,581

[52] U.S. Cl. ..........................................55/4, 23/1 GP, 55/5, 55/10, 55/11, 55/106, 55/122, 55/135
[51] Int. Cl. ..............................................B03c 3/01
[58] Field of Search.....................55/5, 10, 11, 106, 122, 134, 55/135, 4; 23/1

[56] References Cited

UNITED STATES PATENTS

| | | | |
|---|---|---|---|
| 1,291,745 | 1/1919 | Bradley | 55/5 X |
| 2,356,717 | 8/1944 | Williams | 55/6 X |
| 2,381,879 | 8/1945 | Chittum | 55/134 X |
| 2,501,436 | 3/1950 | Cleveland et al. | 23/1 |
| 2,602,734 | 7/1952 | Hedberg et al. | 75/1 |
| 2,677,434 | 5/1954 | Hedberg et al. | 55/134 |
| 2,746,563 | 5/1956 | Harlow | 23/175 X |
| 2,795,401 | 6/1957 | Cooper et al. | 55/135 X |
| 2,841,242 | 7/1958 | Hall | 23/174 X |
| 2,863,723 | 12/1958 | Tigges | 23/168 |
| 2,864,456 | 12/1958 | Hall et al. | 55/106 X |
| 3,523,407 | 8/1970 | Humbert | 55/122 X |
| 3,581,463 | 6/1971 | Roberts | 55/11 X |

FOREIGN PATENTS OR APPLICATIONS

| | | | |
|---|---|---|---|
| 932,895 | 7/1963 | Great Britain | 55/134 |
| 933,286 | 8/1963 | Great Britain | 55/101 |

OTHER PUBLICATIONS

White; Harry J., Industrial Electrostatic Precipitation, Addison–Wessley Publishing Co., Inc., Reading Mass., Copyright 1963, pages 294, 295, 300, 303– 307, 309– 311, 314– 317 (Copy in Technical Library, Call No. TP 156. P7W5i)

*Primary Examiner*—Dennis E. Talbert, Jr.
*Attorney*—Boyce C. Dent, Oscar B. Brumback and Olin E. Williams

[57] ABSTRACT

A method of and apparatus for chemically conditioning a particle-laden gas stream to improve the collection characteristics of the entrained particles comprising the injection of a conditioner solution, preferably ammonium sulfate [$(NH_4)_2 SO_4$], into the gas stream before the stream enters an electrostatic precipitator. The apparatus for injecting the solution includes an injection nozzle, inserted in a gas duct going to the precipitator, connected to a supply of the solution with a power supply and metering means for controlling the amount of solution injected in proportion to the amount of gas being conditioned.

11 Claims, 4 Drawing Figures

Patented May 30, 1972

3,665,676

INVENTOR.
JOHN L. McKEWEN
BY
HIS ATTORNEY

Patented May 30, 1972 3,665,676

INVENTOR.
JOHN L. McKEWEN
BY Bryce C. Went
HIS ATTORNEY

METHOD OF AND APPARATUS FOR CHEMICALLY CONDITIONING A PARTICLE-LADEN GAS STREAM

BACKGROUND OF THE INVENTION

1. Field of the Invention

This invention relates generally to gas separation and more particularly to processes of gas separation involving electric fields and adding gases and vapors.

2. Description of the Prior Art

A conventional way of collecting dust particles in a gas stream in which the particles are entrained is by using an electrostatic precipitator. This apparatus utilizes a corona discharge to ionize the particles passing through an ionization field established by a plurality of discharge electrode wires suspended in a plane parallel to a grounded collecting electrode plate. The ionized particles are attracted to the collector plate from which they may be removed by vibrating or rapping the plate. Examples of this type precipitator are found in Cummings' U.S. Pat. No. 3,109,720 and Pennington U.S. Pat. No. 3,030,753.

Dust particles have different collection characteristics depending somewhat upon their source. One such characteristic is resistivity which is measured in ohm-centimeters. For example, where the source of particles is a coal-fired boiler, there is usually a predictable relationship between the type of coal burned and the resistivity of the particles. Typically, low sulphur coal, i.e., less than 1 percent sulphur, produces particles having high resistivity, e.g., $10^{13}$ ohm-centimeters resistance; coal with 3–5 percent sulphur produces particles having $10^8 - 10^{10}$ resistance; and, poorly combustible coal produces particles having $10^4 - 10^5$ resistance.

It has been found heretofore that the most efficient collection or precipitation of particles occurs when their resistivity is about $10^8$ ohm-centimeters. When their resistivity is higher than this, the precipitation process is encumbered because the particles seem to hold their charge; thus, particles collected on the plate in a layer seem to remain negatively charged and particles subsequently charged in the gas stream are not attracted to the plate thereby leading to a resultant loss of efficiency. Conversely, when the resistivity is lower than $10^8$ ohm-centimeters, the low resistivity particles seem to lose their charge rapidly upon contact with the collector plate thereby being difficult to retain thereon; re-entrainment then occurs with a resultant loss of efficiency. However, when the particles are of the preferred resistivity, a balance is achieved between the tendency to have either overcharged or undercharged particles leading to a resultant increase in precipitation efficiency.

The bulk resistivity of the particles to be conditioned can be determined, if desired, by measuring the bulk resistivity of a sample of such particles in accordance with the American Society of Mechanical Engineers Power Test Code No. 28 (ASME PTC28) entitled "Determining the Properties of Fine Particulate Matter" (paragraph 4.05 describes the "Measurement of Resistivity" and Appendix FIGS. 7–10 describe the apparatus used for measuring the resistivity). Although the Test will reveal the bulk resistivity of the particles, it is not necessary to measure the resistivity in order to practice the present invention because the conditioner is effective regardless of the bulk resistivity of the particles, that is, the amount of conditioner selected does not depend upon the initial bulk resistivity of the particles.

Attempts to control the resistivity of the particles have been made without much success. For example, various chemicals have been injected into the gas stream such as water; anhydrous ammonia; water and ammonia; sulfuric acid; sulfur trioxide; and phosphoric acid. These chemicals have always been injected for reaction in situ with other chemicals naturally present in the gas stream with the hope that a conditioner would be formed in the gas stream. As a result, the resistivity of the particles in the gas has been of a random and uncontrolled nature and entirely dependent on the chemical composition of the gas and/or particles in the gas. Examples of and references to chemicals injected in the gas stream and the conditioners formed thereby may be found in the following patents: water - U.S. Pat. No. 2,746,563, Great Britian Pat. No. 932,895; ammonia - U.S. Pat. No. 1,291,745, U.S. Pat. No. 2,356,717; water and ammonia - U.S. Pat. No. 2,501,435, U.S. Pat. No. 3,523,407; sulfuric acid - U.S. Pat. No. 2,746,563, Great Britian Pat. No. 932,895, U.S. Pat. No. 2,602,734; sulfur trioxide - U.S. Pat. No. 2,746,563, Great Britian Pat. No. 932,895, Great Britian Pat. No. 933,286; and, phosphoric acid - U.S. Pat. No. 3,284,990.

Accordingly, an object of the present invention is to provide an improved and controllable method of conditioning a particle-laden gas stream to improve the collection characteristics of the particles entrained therein, and particularly, of controlling the resistivity of the particles therein, whether such particles are naturally high or naturally low resistivity particles, such method, furthermore, being operative independently of the chemical characteristics of the gas or particles in the gas.

SUMMARY OF THE INVENTION

It has now been discovered that a particle-laden gas stream can be conditioned to improve the electrostatic collection characteristics of the particles therein by injecting selected amounts of a conditioner into the gas stream preceding entry of the gas into an electrostatic precipitator. The conditioner consists of a salt solution, such as a solution of ammonium sulfate [ $(NH_4)_2 SO_4$] or a solution of ammonium bisulfate ($NH_4HSO_4$). Injection is preferably made into a gas duct connecting the source of the gas to the precipitator. If an air preheater is included in the gas duct, then injection is preferably made downstream from the preheater.

The conditioner is preferably an aqueous solution containing 10–20 percent by weight of the salt and by difference 90–80 percent by weight of water.

The preferred amount of conditioner solution injected into the gas stream ranges from 10 to 20 parts of conditioner by volume to a million parts of the gas by volume being conditioned. Since the water in the conditioner solution is merely a carrier, a sufficient amount of the aqueous solution must be injected to assure that 10–20 parts of ammonium sulfate per million parts of gas, as noted above, is injected in the gas stream. Accordingly, any reference hereinafter to the amount of conditioner solution injected means a sufficient amount of the aqueous solution is injected to result in the injection of the preferred amount of ammonium sulfate, or ammonium bisulfate as the case may be.

The gas stream is preferably exposed to the conditioner solution before the particles entrained therein are collected by the electrostatic precipitator for no less than 0.25 seconds with the temperature of the gas being no less than 240° F and no more than 800° F. This exposure period of the gas stream to the conditioner is hereinafter referred to as the influence time.

Apparatus for injecting the conditioner includes at least one nozzle connected to the gas duct, a supply of the conditioner, power means for injecting the conditioner as a liquid (preferably atomized), and a metering means for controlling the amount of conditioner injected in proportion to the volume or weight of gas being conditioned.

The foregoing method generally improves the collection characteristics regardless of the initial characteristics of the gas and particles. Particularly, it controls the resistivity of the particles to within about $10^6$ to $10^{10}$ ohm-centimeters whether or not the particles have a normally low or normally high resistivity characteristic. Furthermore, because an in situ reaction with the chemicals is not required, improvement of collection characteristics is obtained without depending on the chemical characteristics of the gas stream or particles entrained therein.

The use of the conditioner is beneficial even when the bulk resistivity of the entrained particles is at the preferred resistivity of $10^8$ ohm-centimeters which is believed to be the optimum resistivity for collection of particles in the gas. The reason is believed to be that the bulk resistivity is an average of the resistivity of all the particles in the bulk, that is, the bulk of particles usually contains a great proportion of particles of high resistivity and a great proportion of low resistivity particles which cancel each other to result in a bulk resistivity of $10^8$ ohm-centimeters. However, collection efficiency is dependent on the resistivity of the individual particles. Thus, the ability of the conditioner to raise the resistivity of low resistivity particles and to lower the resistivity of high resistivity particles to the optimum resistivity is extremely important; the conditioners previously used were apparently effective only in lowering the resistivity of high resistivity particles.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED METHOD

Figure 1:
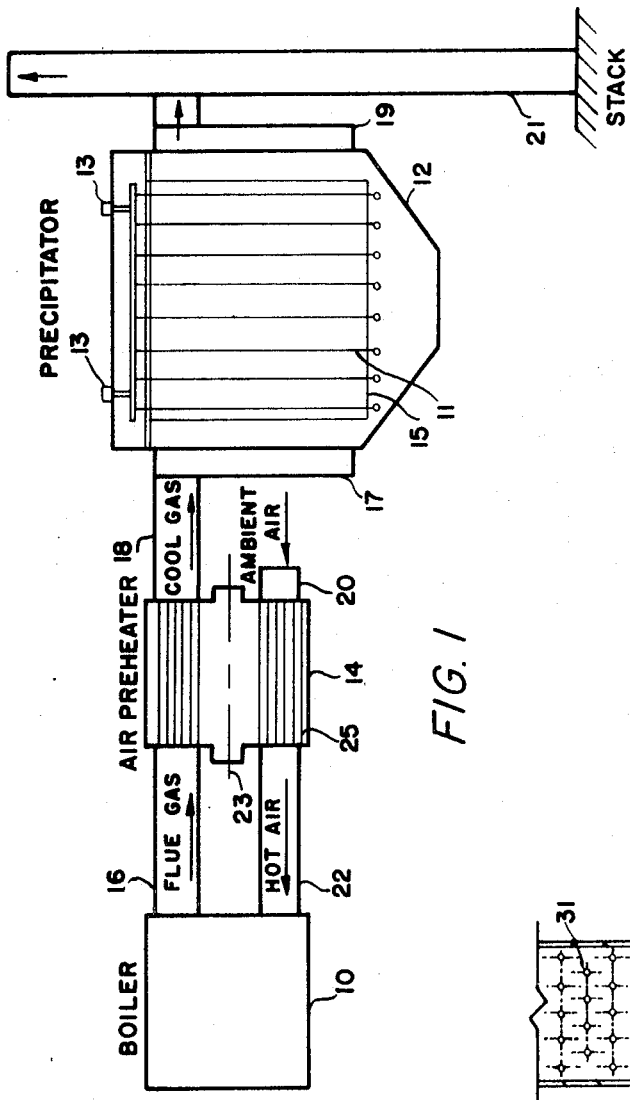
FIG. 1 is a schematic illustration of a boiler connected by a gas duct to an electrostatic precipitator including an air preheater in the duct.

The preferred method of conditioning the particle-laden gas stream comprises injecting a selected amount of a solution of ammonium sulfate, $(NH_4)_2 SO_4$, into a gas stream at a location in advance of entry of the gas and particles to an electrostatic precipitator sufficient to provide a conditioner influence time of at least 0.25 seconds; injection preferably is made downstream from any air preheater in the duct containing the gas stream and injection is preferably made at a point where the gas has a temperature of at least 240° F but not greater than 800° F. Preferably, the amount of solution injected is between 10 and 20 parts by volume per million parts by volume of the gas being conditioned although as little as 5 parts and as much as 30 parts of the solution by volume per million parts of gas by volume may be used. However, using less than 10 parts of conditioner does not appreciably improve collection characteristics of the particles; using more than 20 parts of the conditioner does not improve the collection characteristics of the particles much more than the use of 20 parts. Similar amounts of ammonium bisulfate, $NH_4HSO_4$, can also be used but the ammonium sulfate is preferred because of its lower cost and ease of handling.

The present invention is effective in raising the resistivity of normally low resistivity particles to about the optimum resistivity of $10^8$ ohm-centimeters and of lowering the resistivity of normally high resistivity particles to the optimum of about $10^8$; this optimum resistivity being the desired resistivity for the most efficient collection of the particles in an electrostatic precipitator. The heretofore known methods for changing the resistivity were usually effective only for lowering the resistivity of normally high resistivity particles.

A further important advantage of the present invention is that the conditioner is effective irrespective of the chemical content of the gas being conditioned; that is, the effectiveness of the present invention does not depend on the dust particles or the gas including any particular initial chemical composition to provide a chemical reagent which would then condition the particles in situ. Such dependency upon an in situ chemical reaction was one shortcoming of the heretofore known practice which requires the presence of definite amounts of other chemical constituents in the gas stream. Since the conditioner of the present invention is applied in solution form, it contains all of the elements needed to effectively condition the particles. Thus, the present invention is particularly important today in as much as the trend is to use fuels that have a low sulfur content.

With respect to the ability of the conditioner to raise or lower resistivity of the particles, such ability is stated in this manner for simplicity since the phenomenon is not fully understood. It has been found that the ammonium sulfate granules in dry form have a natural resistance of $10^8$ ohm-centimeters. It is postulated that the injected conditioner masks the natural or normal resistivity of the particles by coating the particle with a film of ammonium sulfate. It has also been postulated that some or all of the particles in the gas may adhere to the injected particles of the ammonium sulfate. It has even been postulated that the ammonium sulfate causes some agglomeration of the fine particles usually found in the gas; it being common knowledge that large agglomerated particles are inherently easier to collect by electrostatic precipitation than small particles. It may also be that the ammonium sulfate has some type of electrical buffering action to maintain the particles at a set resistivity despite wide changes in the composition of the gas or particles therein. While the phenomenon is not completely known, the effects are evident and it will hereinafter be referred to generally as improving the collection characteristics of the particles in the gas stream.

The conditioning does not require an extremely high gas temperature. This feature is advantageous since condensation easily occurs where gases are cooled in the preheater. If any wetting of the particles were to be necessary prior to the passing of the gases through a conventional preheater, such condensation would tend to clog the preheater. Some of the practices heretofore were effective only when injected in gas streams whose temperatures were considerably in excess of those necessary in the present method.

The present invention is surprising in that it was previously believed, for example, Humbert U.S. Pat. No. 3,523,407, that the presence of ammonium sulfate, $(NH_4)_2 SO_4$, in the gas stream was detrimental and that a positive step must be taken to assure the formation in situ in the gas stream of ammonium bisulfate, $NH_4 HSO_4$, rather than ammonium sulfate; this step comprised injecting the ammonia and water in the gas duct at a location where the gas temperature was preferably at least 400° F, usually upstream from the preheater. The present invention is also in contrast to the heretofore known practice involving the in situ chemical reaction of ammonia and water with chemicals in the gas since the latter reaction requires the presence of sulfur trioxide in the gas stream for the in situ formation of a reagent for conditioning the particles which formation also requires a high gas temperature. Since the higher gas temperature is usually present only upstream from the preheater, the conditioned particles in the heretofore known practice must with the aforementioned tendency pass through the preheater to clog, especially if a high gas temperature not be maintained. Since the ammonium sulfate in accordance with the present invention is capable of conditioning the particles at low temperatures, e.g., 240° F, it can be injected after the gas has passed through the preheater thereby removing any possibility of clogging the preheater. Furthermore, the process of this invention involving ammonium sulfate injected in solution form appears not to cause the formation of any sticky substances usually detrimental to precipitator operation.

In accordance with this invention, the preferred temperature of the gas stream at the location where the conditioner is injected into the gas stream is between 240° F and 800° F. Injection at temperatures below 240° F does not present the great improvement in the collection characteristics of the particles; and, when the temperature of the gas stream approaches 800° F, ammonia may be liberated from the ammonium sulfate conditioner. The latter reaction does not appear to be reversible in gas cleaning operation, that is, the ammonia does not recombine with the sulfur constituent to reform the compound ammonium sulfate if the gas stream cools farther downstream. Furthermore, if the gas stream contains any sulfur trioxide, the ammonia is likely to react to form ammonium bisulfate but not in sufficient time for the bisulfate to condition the particles before the gas stream enters the precipitator.

Referring now to FIG. 1, the invention is illustrated as being incorporated in a power station which may include a coal-fired boiler 10 whose flue-gas is directed to an electrostatic precipitator 12 by way of ducts 16 and 18 through an air preheater 14 which transfers heat from the particle-laden exhaust flue-gas to the air supply for boiler 10.

The precipitator 12 includes discharge electrodes 11 suspended from insulators 13 in the conventional manner and collector electrodes 15 (only one shown) supported by the shell of the precipitator in the conventional manner. The relatively cool gas (300° – 400° F) in duct 18 usually flows into a plenum 17 and then through the precipitator 12 and into an exhaust plenum 19 and thereafter into an exhaust stack 21 from which the cleaned gas passes to atmosphere.

Preheater 14 may be one of the several well-known types. A common type comprises a cylindrical shell rotatable about an axis 23 and which is filled with a labyrinth of metal grids 25. As the shell is rotated, a portion of the grids comes into alignment with ducts 16 and 18. The flue-gas is conducted into the shell and through the grids thereby heating the grids. As the shell continues to rotate, the heated grids are brought into alignment with air inlet 20 and connecting duct 22. Atmosphere or ambient air drawn into inlet 20 flows through the heated grids and absorbs heat therefrom. The heated air passes into duct 22 which directs it into the combustion chamber of boiler 10. Appropriate seals 27 and the like are provided so that the heater 14 may operate continuously.

The preheater at a power plant, for example, usually receives flue-gas having a temperature of about 650° F. The temperature of the relatively cool gas exiting into duct 18 is usually about 300° – 400° F. The ambient atmosphere entering inlet 20 will be heated to about 500° F. in preheater 14 and will exit into duct 22 at that temperature.

The conditioner solution is readily made from ordinary tap water and commercial grade ammonium sulfate granules. Preferably, the solution comprises 10–20 percent by weight of ammonium sulfate with the difference being 90–80 percent water by weight to form 100 parts. However, as little as 5 percent and as much as 50 percent of ammonium sulfate by weight may be used. When less than about 10 percent ammonium sulfate is used, then more water is required which is undesirable. When more than 20 percent ammonium sulfate is used, it becomes more difficult to dissolve the ammonium sulfate in the water. The concentration chosen is a practical matter depending on the solids present in the solution which may tend to clog the spray nozzles. If the concentration is weak, then it will be necessary to add a greater volume of the solution to the gas stream in order to get the desired amount of ammonium sulfate in the gas stream.

If ammonium bisulfate is used, it can be made by dissolving, for example, one pound of ammonium sulfate granules and about 0.73 pounds of concentrated sulfuric acid in water. This mixture will yield 1.73 pounds of ammonium bisulfate in the water. The amount of bisulfate in the water should be about 10–20 parts by weight and, by difference, 90–80 percent by weight of water.

This rate of injection of the solution must be calculated since the conditioning of the gas is a dynamic operation. The rate is easily determinable by those skilled in the art by their knowledge that 10–20 parts of ammonium sulfate by volume, or 10–20 parts of ammonium bisulfate by volume, is to be injected into a million parts of gas by volume.

The ammonium sulfate seems to have an affinity for dust particles. It is believed that most, if not all, of the particles are subjected to the conditioning action of the ammonium sulfate. An influence time during which the ammonium sulfate conditions the gas stream is necessary. At least 0.25 seconds, and preferably 1.5 seconds, influence or residence time is needed for the desired conditioning phenomenon to occur. Accordingly, an injection nozzle 31 connected to the end of conduit 26 should be installed in duct 18 a sufficient distance from the inlet of precipitator 12 to provide the desired influence time; of course, the velocity of the gas must be considered in calculating the distance needed.

Figure 4:
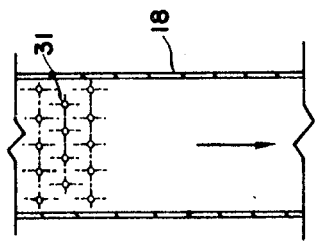
FIG. 4 is a sectional view of a gas duct taken along line IV — IV in FIG. 2 showing an array of injector nozzles for injecting conditioner into the gas stream.
Figure 2:
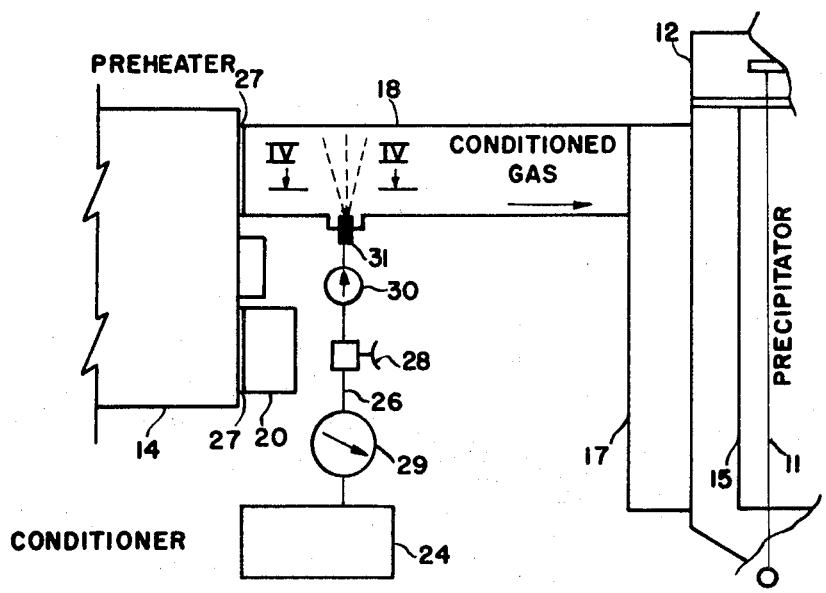
FIG. 2 is a schematic illustration of satisfactory apparatus for injecting the gas conditioner into the gas stream and showing the preferred location for injection of the gas conditioner into the gas stream.

Although only one nozzle 31 is illustrated in FIG. 2, an array of such nozzles is preferably installed in duct 18. An example of such an array is illustrated in FIG. 4. If desired, the nozzles may be placed on more than one or on all four sides (not shown) of the duct. The array assures a substantially even distribution of the conditioner in the gas stream.

It is also helpful but not essential to place the nozzles 31 in duct 18 so that, during the influence time, the gas is not affected by bends in the duct, turning vanes, or any other obstruction that might negatively influence the reaction.

The size and type of nozzle is not particularly critical. It is desired of course to contact the particles with the ammonium sulfate solution as intimately as possible. Accordingly, it is desirable that the solution be injected with the conditioner as a spray of small discrete droplets.

It has also been found helpful to make the pump 29, valve 28, meter 30, and injection nozzle 31 from materials that are compatible with ammonium sulfate to reduce the possibility of corrosion, clogging, etc. For example, brass is generally incompatible with ammonium sulfate and should not be used. On the other hand, stainless steel remains relatively unaffected by exposure to ammonium sulfate.

The various gas ducts, plenums, and precipitator can be constructed of the materials normally used such as mild steel, in their construction. They do not appear to be subject to corrosion from the conditioned particles and, being large, they do not clog up.

Figure 3:
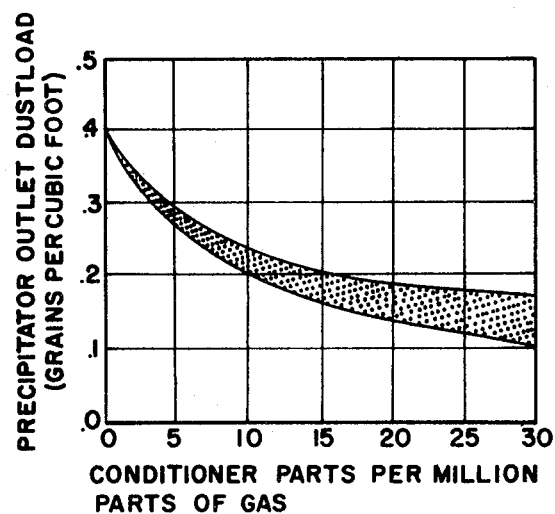
FIG. 3 is a graph illustrating the beneficial effects of injecting the conditioner into the gas stream.

The efficiency of an electrostatic precipitator can be determined by the amount of particles or dust load released to the atmosphere from the precipitator outlet. The dust load is usually measured in grains per cubic foot of gas. As illustrated in FIG. 3, a typical fly-ash precipitator will have an outlet dust load of 0.4 grains per cubic foot of gas at its normal operating temperature and pressure without the use of a conditioner. The curves shown in the graph of FIG. 3 show the outlet dust loading reduction as a function of the quantity of ammonium sulfate added. As illustrated, the dust loading can be reduced to as much as 0.15 grains per cubic foot by the injection of 15 parts of the conditioner by volume per million parts of gas by volume; beyond that, additional conditioner has a reduced effect up to about 30 parts of the conditioner per million parts of gas as illustrated in FIG. 3. It should be understood that variables such as gas temperature, influence time, and the amount of dust to be conditioned affect the overall result. Therefore, the reduction in outlet dust loading usually falls within the shaded area shown in FIG. 3. If the outlet dust loading is normally more or less than 0.4 grains per cubic foot of gas, the reduction achieved by using the present invention will be in substantial proportion to the reduction shown in FIG. 3.

OPERATION

In operation, the boiler 10 is fired and the precipitator 12 energized. When the flue-gas leaving the preheater in duct 18 attains 240° F or above, the conditioner is injected into the gas stream by opening throttle valve 28. This valve is opened to supply the desired amount of conditioner; the amount can be determined by reading the meter 30. Exactly what the desired setting will be is determined by the volume of gas flow through duct 18. Suitable conventional meters (not shown) can be provided to indicate the gas volume flowing in duct 18. The conditioned gas passes through duct 18 to the precipitator 12 where most of the dust particles are collected in the conventional manner. The air preheater, as mentioned, heats incoming atmosphere and supplies preheated air through duct 22 to boiler 10 to aid in combustion of the fuel.

The amount of conditioner added in proportion to the amount of gas can be determined in any convenient manner. For example, the conditioner may be added at the rate of 10–20 parts by volume per one million parts of the gas stream by volume, or equivalently, at a rate of 43–87 parts of conditioner by weight per one million parts of the gas by weight. Either way, it is necessary to calculate the amount of gas flowing past the injection nozzles and inject the conditioner accordingly.

If desired, conventional automatic controls can be provided to open throttle valve 28 when the flue-gas reaches the desired operating temperature and to close it should the temperature fall below operating temperature. The automatic controls can also be made to open the valve to provide the amount of conditioner needed in proportion to the volume of gas flowing in duct 18.

Thus, the invention having been described in its best embodiment and mode of operation, that which is desired to be claimed by Letters Patent is:

I claim:

1. A method of conditioning a particle-laden gas, comprising:
   forming a mixture of said gas at a temperature of between 240° F and 800° F with 5–30 parts of an aqueous solution by volume per million parts of said gas by volume for at least 0.25 seconds, said aqueous solution containing from 10–20 parts by weight of ammonium sulfate or bisulfate.

2. A method of improving the collection characteristics of particles entrained in a particle-laden gas for collection by an electrostatic precipitator, comprising the steps of:
   a. injecting 5–30 parts by volume of an aqueous solution of ammonium sulfate or bisulfate into a million parts by volume of said particle-laden gas while said gas has a temperature of between 240° F and 800° F, said solution containing between 5 and 50 per cent by weight of ammonium sulfate or bisulfate;
   b. maintaining said particles and said solution in contact for at least 0.25 seconds to condition said particles; and
   c. after said conditioning, directing said stream into said precipitator to collect said particles therein.

3. A method of improving the collection characteristics of particles entrained in a gas stream for collection in an electrostatic precipitator, comprising:
   exposing a million parts by volume of said gas stream, at a temperature of between 240° F to 800° F, to the influence of 10–20 parts by volume of an aqueous solution containing at least 10 parts by weight of ammonium sulfate or bisulfate for at least 0.25 seconds prior to the entry of said gas into said precipitator 4. A method of improving the collection characteristics of particles entrained in a particle-laden gas for collection by an electrostatic precipitator, comprising the steps of:
   a. directing a stream of said particle-laden gas through a gas duct leading to said precipitator;
   b. measuring the temperature of said gas in said duct;
   c. measuring the volume of said as in said duct;
   d. automatically injecting an aqueous solution containing 10–20 parts by weight of ammonium sulfate or bisulfate into said duct at the rate of 10–20 parts by volume of said solution per million parts of said gas by volume flowing in said duct when said gas attains a temperature of at least 240° F;
   e. maintaining said particles in contact with said solution for at least 0.25 seconds to condition said particles prior to entry into said precipitator; and
   f. after said conditioning, collecting said conditioned particles in said precipitator.

5. The method of claim 4 including the additional step of automatically halting the injection of said aqueous solution in response to the temperature of said gas falling below 240° F and rising above 800° F.

6. Apparatus for conditioning a particle-laden gas having a temperature of at least 240° F flowing through a gas duct into an electrostatic precipitator to improve the collection characteristics of particles entrained in said gas by said precipitator, comprising:
   supply means containing an aqueous solution containing from 5 to 50 percent by weight of ammonium sulfate or bisulfate;
   injector means connected to said supply means and to said duct for injecting said solution into said gas,
   the distance between said injector means and said precipitator being sufficient to provide an influence time between said solution and said particles of at least 0.25 seconds prior to entry of said particles into said precipitator for conditioning said particles; and
   control means for controlling the supply of said solution to said injector means to provide from 5 to 30 parts by volume of said solution per million parts of said gas flowing through said duct.

7. The apparatus of claim 6 further including air preheater means connected to said duct upstream from said precipitator for reducing the temperature of said gas flowing to said precipitator to at least 800° F,
   said injector means being connected in said duct between said preheater means and said precipitator.

8. The apparatus of claim 6 wherein said injector means comprises an array of injection nozzles connected to said supply means and to said duct for substantially evenly distributing said solution in said gas.

9. The apparatus of claim 6 wherein said injector means includes conduit means connecting said supply means to said duct, said conduit means including:
   pump means connected to said conduit means for pumping said solution to said duct;
   said control means including valve means in said conduit means between said pump means and said duct for regulating the amount of solution applied to said duct; and
   indicator means for indicating the amount of solution supplied to said duct.

10. The apparatus of claim 9 wherein said control means includes automatic control means operative in response to the temperature of said gas for opening said valve means and starting said pump means when the temperature of said gas rises to at least 240° F.

11. The apparatus of claim 9 wherein said control means includes automatic control means operative in response to the volume of gas flowing in said duct for controlling said valve means to regulate the volume of said solution injected into said gas in preselected proportion to the volume of said gas flowing in said duct.

* * * * *